United States Patent
Neeser

(10) Patent No.: US 9,030,935 B2
(45) Date of Patent: May 12, 2015

(54) DEVICE AND METHOD FOR ADJUSTING RATE LIMITS FOR TRANSMISSION RATES OF DATA FLOWS HAVING A CERTAIN PRIORITY IN A TRANSMITTER

(75) Inventor: Fredy D. Neeser, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 13/414,221

(22) Filed: Mar. 7, 2012

(65) Prior Publication Data

US 2012/0250507 A1 Oct. 4, 2012

(30) Foreign Application Priority Data

Mar. 30, 2011 (EP) .................................. 11160376

(51) Int. Cl.
*H04L 1/00* (2006.01)
*H04L 12/801* (2013.01)
*H04L 12/851* (2013.01)
*H04L 12/865* (2013.01)
*H04L 12/825* (2013.01)

(52) U.S. Cl.
CPC ................ *H04L 47/12* (2013.01); *H04L 47/24* (2013.01); *H04L 47/6275* (2013.01); *H04L 47/266* (2013.01)

(58) Field of Classification Search
None
See application file for complete search history.

(56) References Cited

U.S. PATENT DOCUMENTS

| | | | | |
|---|---|---|---|---|
| 3,454,718 A | * | 7/1969 | Perreault | 375/276 |
| 5,631,934 A | * | 5/1997 | Åstrom et al. | 375/372 |
| 6,219,343 B1 | * | 4/2001 | Honkasalo et al. | 370/335 |
| 7,385,997 B2 | * | 6/2008 | Gorti et al. | 370/415 |
| 7,668,103 B1 | * | 2/2010 | Pannell et al. | 370/237 |
| 7,701,884 B2 | * | 4/2010 | Chapweske et al. | 370/260 |
| RE41,970 E | * | 11/2010 | Delattre et al. | 370/230.1 |
| 7,903,552 B2 | * | 3/2011 | McAlpine et al. | 370/230 |
| 8,514,713 B2 | * | 8/2013 | Jain | 370/235 |
| 8,539,359 B2 | * | 9/2013 | Rapaport et al. | 715/751 |
| 2002/0135845 A1 | * | 9/2002 | Robinson et al. | 359/189 |
| 2003/0064734 A1 | * | 4/2003 | Stilp et al. | 455/456 |
| 2003/0076848 A1 | * | 4/2003 | Bremler-Barr et al. | 370/412 |
| 2003/0163593 A1 | * | 8/2003 | Knightly | 709/251 |
| 2003/0212779 A1 | * | 11/2003 | Boyter et al. | 709/223 |
| 2003/0225905 A1 | * | 12/2003 | Scifres et al. | 709/234 |
| 2004/0064577 A1 | * | 4/2004 | Dahlin et al. | 709/235 |
| 2004/0143672 A1 | * | 7/2004 | Padmanabham et al. | 709/231 |
| 2004/0233912 A1 | * | 11/2004 | Droz et al. | 370/395.21 |
| 2005/0111361 A1 | * | 5/2005 | Hosein | 370/230 |
| 2005/0234577 A1 | * | 10/2005 | Loughran et al. | 700/100 |

(Continued)

*Primary Examiner* — Phirin Sam
*Assistant Examiner* — Faiyazkhan Ghafoerkhan
(74) *Attorney, Agent, or Firm* — Garg Law Firm, PLLC; Rakesh Garg; Jennifer R. Davis

(57) ABSTRACT

A device for adjusting a set of primary rate limits for transmission rates of data flows having a certain priority in a transmitter is provided, wherein data flows of different priorities including said certain priority are transmitted by a port of the transmitter. The transmission of the data flows having the certain priority is limited by secondary rate limits per data flow and by a transmission or flow control per priority. The device comprises a determiner and a number of adjusters. The determiner is configured to determine a mean value of a duty cycle of the certain priority at the port provided by the transmission or flow control. The adjusters are configured to adjust the primary rate limits for the transmission rates of the data flows having the certain priority based on the determined mean value of the duty cycle to obtain the secondary rate limits.

12 Claims, 7 Drawing Sheets

(56) References Cited

U.S. PATENT DOCUMENTS

| | | |
|---|---|---|
| 2005/0243817 A1* | 11/2005 | Wrenn et al. .................. 370/389 |
| 2006/0215550 A1* | 9/2006 | Malhotra ..................... 370/229 |
| 2007/0008884 A1* | 1/2007 | Tang .............................. 370/230 |
| 2007/0171914 A1* | 7/2007 | Kadambi et al. ........... 370/395.2 |
| 2008/0002635 A1* | 1/2008 | Mosko et al. .................. 370/338 |
| 2008/0008183 A1* | 1/2008 | Takagaki et al. .............. 370/392 |
| 2008/0089232 A1* | 4/2008 | Xu ................................. 370/235 |
| 2009/0161692 A1* | 6/2009 | Hirata et al. ................... 370/466 |
| 2010/0208589 A1* | 8/2010 | Xu ................................. 370/232 |
| 2010/0208743 A1* | 8/2010 | Short et al. .................... 370/401 |
| 2010/0329118 A1* | 12/2010 | Adams .......................... 370/235 |

* cited by examiner

DEVICE AND METHOD FOR ADJUSTING RATE LIMITS FOR TRANSMISSION RATES OF DATA FLOWS HAVING A CERTAIN PRIORITY IN A TRANSMITTER

FIELD OF THE INVENTION

The invention relates to a device for adjusting a set of primary rate limits for transmission rates of data flows having a certain priority in a transmitter. Further, the invention relates to a transmitter for transmitting data flows having different priorities over one port.

BACKGROUND

In order to reduce congestion at bottlenecks in a network, transmissions for rate-limited data flows of a certain priority are limited by rate limits per data flow that are established based upon feedback from the network. Further, the transmissions for all data flows having the certain priority are controlled or governed by a transmission or flow control per priority.

High link speeds and short delays of data flows are provided by Converged Enhanced Ethernet (CEE) datacenters. CEE datacenters may provide lossless operation and lossless traffic classes beyond the traditional lossy operation, in particular lossy traffic classes.

To avoid network congestion with effects such as head-of-line blocking and saturation trees, lossless CEE operation may require a distributed congestion management (CM) according to IEEE 802.1Qau (QCN) with congestion detection at so-called Congestion Points (CPs), the formation of Congestion Notification Messages (CNMs) sent to traffic sources, and rate limitation at the traffic sources in so-called Reaction Points (RPs).

A Congestion Point (CP) is a VLAN-aware bridge or end station port function that monitors a single queue serving one or more priority values. This queue, which may be referred to as CP buffer, can be placed at the output or input of a CEE switch or bridge, or at the input of an end station port function, and may be traversed by traffic from multiple sources and to multiple destinations.

The occupancy of the CP buffer can change due to temporary differences between the overall arrival rate and the overall departure rate in bytes/second. When multiple priority values are supported, a separate CP buffer is typically provided for each priority value. A QCN CP may determine the strength of congestion by taking into account the CP buffer occupancy as well as its rate of change. A CP buffer can be a simple FIFO queue or, more generally, a portion of a Random Access Memory (RAM).

For limiting the transmission rate of frames for one or more congestion-controlled flows in response to receiving CNMs, a Reaction Point (RP) may be used as an end-station port function. RPs may be provided by a CEE-compliant Network Interface Card (NIC) or a Converged Network Adapter (CNA), which is a CEE-compliant NIC that provides additional higher-layer functionality. An RP controls the transmission rate of frames for one or more congestion-controlled flows by applying a rate limit that may be updated dynamically. The rate limit is reduced multiplicatively in response to receiving CNMs from congestion points and increased additively when a number of frames have been transmitted without receiving further CNMs, or when a self-increase timer has elapsed.

CEE switches and end-stations may employ priority-based flow control at their receive queues for lossless operation. Priority-based Flow Control (PFC) may provide an independent flow control for the priority values and their associated receive queues. It prevents frame loss in receive queues due to lack of space by sending PFC pause frames to the upstream sender when one priority queue or multiple priority queues reach a high-water threshold, and by sending PFC unpause frames when the queues are sufficiently drained to reach a low-water threshold. The receive queues may be protected by both PFC and QCN. In such a case, the receive queues are also QCN congestion points as described above. When a PFC pause frame, i.e., a PFC message with a positive pause duration, reaches a CEE-compliant NIC (also referred to as "NIC" in the following), the NIC pauses transmission for priorities that are selected by the PFC pause frame for a duration specified in the PFC pause frame.

In accordance with QCN, PFC and Enhanced Transmission Selection ETS, a NIC transmitter typically uses a hierarchical scheduler. The hierarchical scheduler may be comprised of a QCN scheduler stage for scheduling flows according to QCN rate limits, and of a PFC/ETS scheduler stage for scheduling priorities.

The QCN scheduler stage may have a flow scheduler for each priority and for each port. The respective flow scheduler may select frames for transmission from rate-limited flow queues by taking into account the earliest next departure time of each rate-limited flow according to its current rate limit. Then, a transmission selection function may select frames for transmission from different priorities or traffic classes, taking into account the pause state of each priority as provided, for example, by PFC. Moreover, the transmission selection function may take into account any scheduling constraints, such as strict priority scheduling or bandwidth allocation imposed on priorities or traffic classes.

An interoperability problem between QCN and PFC may arise, because the rate limits provided for the congestion-controlled flows of a priority are further reduced by inserting transmission pauses for that priority. If QCN establishes the rate limits in a phase with considerable pause activity, then the effective rate limits are actually lower due to the insertion of transmission pauses. For example, if a transmission link priority is used by multiple sources with an oversubscription ratio N greater than 1, then transmission pauses have to be inserted for the priority with a pause on/off pattern, which effectively activates the priority during a fraction 1/N of time.

When QCN has throttled the multiple sources sufficiently, the priority transitions from a PFC-dominated regime to a PFC-free regime. In case of many synchronized sources with a high oversubscription ratio N, the PFC-dominated regime has a correspondingly longer duration. One problem may be that the transition of a priority to the PFC-free regime can occur within a short amount of time, rapidly increasing the effective rate limits for all rate-limited as well as for all non-rate-limited flows of the priority. This may result in further PFC pauses on the adjacent link, aggravates congestion at downstream congestion points, and forces the downstream congestion points to send yet more CNMs. In a system with many congestion points, this interaction between PFC and QCN may reduce system stability and may lengthen the duration of PFC dominated regimes.

A flow control scheme such as PFC pause is necessary for lossless operation, but is known to introduce side effects such as head-of-line (HOL) blocking and delay jitter. Therefore, in a system providing both QCN and PFC, it may be important to control congestion as much as possible using QCN rate limiting, and to apply PFC pause only as a last resort to avoid frame loss.

The hierarchical scheduling that is necessary for a CEE-compliant NIC transmitter supporting QCN reaction points as well as PFC and ETS may introduce an undesirable coupling between the effective fine-grained per-flow QCN rate limits and the coarse-grained per-priority pause and inter-priority scheduling activities as introduced, for example, by PFC and ETS, respectively. As a result, QCN rate limits of rate-limited flows may become incorrect or inaccurate when pause activity starts or stops gating transmission of an entire priority, or when inter-priority scheduling changes the bandwidth available to a priority.

Accordingly, it is an aspect of the present invention to provide a solution for reducing the undesirable coupling between the effective fine-grained per-flow rate limits and the coarse-grained per-priority pause and inter-priority scheduling activities.

SUMMARY

According to a first aspect, a device for adjusting a set of primary rate limits for transmission rates of data flows having a certain priority in a transmitter is suggested, wherein data flows having different priorities including said certain priority are transmitted by a port of the transmitter. Transmissions for rate-limited data flows having the certain priority are limited by secondary rate limits per data flow and transmissions for all data flows having the certain priority are controlled or governed by a transmission or flow control per priority. The device comprises a determiner and a number of adjusters. The determiner is configured to determine a mean value of a duty cycle of the certain priority at the port as obtainable from the transmission or flow control. The adjusters are configured to obtain the secondary rate limits by adjusting the primary rate limits for the transmission rates of the data flows having the certain priority based on the determined mean value of the duty cycle.

In particular, the respective primary rate limit is multiplied with a reciprocal value of the determined mean value of the duty cycle value to obtain the respective secondary rate limit. The data flows of said different priorities are transmitted by the port of the transmitter across a data link. The mean value of the duty cycle corresponds to the fraction of time during which transmission at the certain priority is not suspended as a result of priority pause or flow control indications from a downstream receiver coupled to the data link, or as a result of inter-priority scheduling activity.

Further, the device may have a flow scheduler for scheduling the transmission of the data flows having the certain priority subject to the secondary rate limits for the data flows and to the transmission or flow control for the entire priority.

According to some implementations, the secondary rate limit for the rate-limited data flows is obtained such that the primary rate limit as well as the effective rate limit approaches a value that is suitable for an ideal priority duty cycle of 1 and is, in particular, at least in a first-order approximation, independent of the actual duty cycle of the certain priority at the port. Thus, the undesirable coupling between the effective line-grained per-flow rate limits and the coarse-grained per-priority pause and inter-priority scheduling activities affecting the duty cycle of the certain priority at the port may be prevented.

In an embodiment, the device comprises a rate limiter and an adjuster for each rate-limited data flow having the certain priority. The rate limiter is configured to provide a primary rate limit for the transmission rate. The adjuster is configured to obtain a secondary rate limit by adjusting the provided primary rate limit based an the determined mean value of the duty cycle.

Further, the adjuster may be configured to multiply the primary rate limit with a reciprocal value of the determined mean value of the duty cycle value to obtain the secondary rate limit.

In particular, the adjuster may be configured to calculate a compensation factor as a reciprocal value of the determined mean duty cycle value and to multiply the primary rate limit by the calculated compensation factor.

In a further embodiment, the device may include the functionality of one or more reaction points. Specifically, each included reaction point may provide a receiver that is configured to receive messages identifying the corresponding rate-limited data flow as a source of congestion and to control the primary rate limit of the rate limiter. In particular, the receiver of each reaction point is configured to receive Congestion Notification Messages (CNMs) for computing the primary rate limit.

In a further embodiment, the device may include a flow scheduler for the certain priority, in particular for each priority of the different priorities. The flow scheduler is configured to schedule the transmission of data frames across the rate-limited as well as non-rate-limited data flows having the certain priority on the basis of the secondary rate limit of each rate-limited data flow and may take into account a corresponding earliest next departure time.

In a further embodiment, the device comprises a selector for each rate-limited data flow of the certain priority. The selector is configured to select a minimum of the secondary rate limit and of a maximum rate that is configured for the certain priority.

In a further embodiment, the device comprises a flow scheduler for the certain priority, in particular for each priority of the different priorities, where the flow scheduler of the certain priority is configured to schedule the transmission of data frames across the rate-limited data flows on the basis of the selected minimum of the secondary rate limit and of the maximum rate and may take into account a corresponding earliest next departure time for each rate-limited data flow.

In a further embodiment, the device includes a rate-limited flow queue for each data flow of the certain priority, a flow multiplexer for the certain priority coupled to the rate-limited flow queues and the flow scheduler for the certain priority for controlling the flow multiplexer. The flow scheduler may perform its scheduling by using the earliest next departure times computed by individual schedulers of the data flows.

The flow scheduler may additionally control the flow multiplexer using a round-robin scheme to select a data flow for transmission from the data flows that have frames on their flow queues and are eligible to send based on their secondary rate limits or the resulting earliest next departure times.

In a further embodiment, the determiner has a low-pass filter for providing the mean value of the duty cycle of the certain priority by filtering a binary-valued signal indicating that the transmission at the certain priority is currently active or suspended at the port due to the flow control for the certain priority. The mean value of the duty cycle of the certain priority may also be determined by averaging the duty cycle of the certain priority over any sliding window of time and through any other averaging method.

In a further embodiment, the certain priority is flow-controlled by means of per-priority pause and unpause signaling. The per-priority pause and unpause signaling is also referred to as Priority-based Flow Control (PFC).

In a further embodiment, the certain priority is selected for transmission based on per-priority pause and unpause signaling as well as inter-priority scheduling constraints, such as strict priority scheduling and bandwidth allocation to priorities.

In a further embodiment, transmission for the certain priority is controlled by means of per-priority pause and unpause signaling (PFC) or any other per-priority flow control scheme, and by inter-priority scheduling constraints. The inter-priority scheduling constraints may be imposed by Enhanced Transmission Selection (ETS). Thus, the certain priority is selected for transmission subject to inter-priority scheduling constraints and per-priority flow control.

In a further embodiment, the device has a reaction point (RP) for each rate-limited data flow having the certain priority p. In particular, the RPs may be configured to eliminate the need to adjust the rate limits of all rate-limited flows of a priority p as a result of increased or decreased PFC pause activity due to temporary overload and/or scheduling changes resulting from ETS scheduling constraints. The RP has a rate-limited flow queue for the rate-limited data flow having the certain priority p, a rate limiter for providing the primary rate limit $r_n$ for the transmission rate for the rate-limited data flow, a multiplier for multiplying the primary rate limit $r_n$ with a compensation factor $c_p(t)$ to obtain the secondary rate $r_n'$ ($r_n' = r_n \cdot c_p(t)$), a selector for selecting a minimum $r_n''$ of the secondary rate limit $r_n'$ and of a maximum rate $R_p$ that is configured for the certain priority p ($r_n'' = \min(r_n', R_p)$).

The following example may illustrate this: Suppose that a NIC transmit port is subject to T-periodic PFC pauses for priority p, with a priority duty cycle $d_p = \tau/T$, where $0 < d_p \leq 1$. When PFC pause activity gates the QCN rate limiter with current rate $r_n$, an effective rate limit $r_{\mathit{eff},n} = d_p \cdot r_n$ results.

First, an estimate $\hat{d}_p(t) \leq 1$ of the priority duty cycle is determined. The estimate $\hat{d}_p(t)$ represents the fraction of time the priority p is active. Second, a feedback is provided from the priority duty cycle determiner or estimator to the RP, where the rate limit $r_n$ of the QCN rate limiter is divided by the estimated duty cycle $\hat{d}_p(t)$ and capped at a maximum rate $R_p$ to obtain a modified rate limit $r_n''$.

$$r_n'' = \min(r_n/\hat{d}_p(t) \cdot R_p) \geq \min(r_n, R_p) \tag{1}$$

Third, the modified rate limit $r_n''$ is used for scheduling in the QCN scheduler stage of the NIC hierarchical scheduler.

The flow-specific QCN control loop in combination with the priority duty-cycle compensation may let the QCN rate limiter of the present RP converge to a primary rate limit, which corresponds to an ideal priority duty cycle of 1 and is, to a first-order approximation, independent of the actual priority duty cycle.

The priority duty cycle may depend on the collective behavior of all flows of the priority, including flows that are not yet or no longer QCN rate-limited. Moreover, the priority duty cycle may change rapidly as a result of a change in total offered load, whereas a QCN rate limit may change rarely in comparison, particularly if many flows are simultaneously active.

As a result of the PFC/ETS scheduler stage of the NIC hierarchical scheduler, the modified rate limit $r_n''$ is further modified to an effective rate limit $$r_{\mathit{eff},n} = d_p(t) \cdot r_n'' = \min(r_n, d_p(t) \cdot R_p). \tag{2}$$

Equation (2) shows that the effective rate limit of a flow is given by the QCN rate limit $r_n$, unless $r_n$ exceeds $d_p(t) \cdot R_p$, the maximum rate possible for a single flow. This means that, in a region of linearity, the adaptation of the QCN rate limit $r_n$ absorbs the rate reduction due to the insertion of priority pauses and inter-priority scheduling, i.e., it absorbs the multiplicative rate reduction factor $d_p(t) < 1$. The transmission may be suspended for a priority and therefore $d_p(t) < 1$, due to PFC pauses or ETS scheduling constraints. In a region of linearity, priority duty-cycle compensation thus ensures that both PFC pause activity and ETS scheduling constraints across priorities are taken into account and in fact absorbed by the stochastic adaptation of the QCN rate limiters, where the speed of adaptation to the PFC and ETS constraints is given by the adaptation gains and time constants of the QCN feedback loops.

A rapid reduction of the priority duty cycle is needed for losslessness in temporary overload scenarios with many sources, where QCN may have difficulties to throttle the many sources quickly enough for avoiding PFC pauses. It may be noted that a PFC pause globally affects all flows of a priority, even those which are not yet, or no longer, QCN rate-limited. An advantage of the present priority duty-cycle compensation may be that a reduction of the priority duty-cycle for resolving temporary overload conditions first and foremost reduces the throughput of flows that are not currently QCN rate-limited. At the same time, priority duty-cycle compensation may reduce the need to further adjust the rate limits of flows that already are QCN rate-limited.

There are congestive scenarios with many synchronized sources, where synchronized PFC oscillations may occur on multiple links of a system over considerable durations. It was found through simulations that priority duty-cycle compensation greatly speeds up the convergence of QCN rate limiters in the presence of such PFC oscillations and thereby reduces the duration of undesirable phases of operation that are dominated by PFC pause activity and associated head-of-line (HOL) blocking.

Any embodiment of the first aspect may be combined with any embodiment of the first aspect to obtain another embodiment of the first aspect.

According to a second aspect, the invention relates to a transmitter for transmitting data flows having different priorities over one port. The transmitter has a device for each certain priority of the different priorities according to the first aspect or according to any embodiment of the first aspect. The respective device has at least one determiner, one rate limiter for each rate-limited data flow having the certain priority and one adjuster for each rate-limited data flow having the certain priority. The respective rate limiter is configured to provide a primary rate limit for the transmission rate of the respective data flow. The determiner is configured to determine a mean value of a duty cycle of the certain priority at the port. The respective adjuster is configured to obtain a secondary rate limit by adjusting the respective provided primary rate limit based on the determined mean value of the duty cycle.

In an embodiment, the transmitter is embodied by a Converged Enhanced Ethernet (CEE) compliant Network Interface card (NIC). Moreover, the transmitter may be embodied by a switch or gateway.

In a further embodiment, the transmitter comprises a hierarchical scheduler. The hierarchical scheduler may have a QCN scheduler stage for scheduling flows according to QCN rate limits, and a PFC/ETS scheduler stage for scheduling priorities.

According to a third aspect, a method for adjusting a set of primary rate limits for transmission rates of data flows having a certain priority in a transmitter is suggested. Data flows having different priorities including said certain priority are transmitted by a port of the transmitter. Transmissions for rate-limited data flows having the certain priority are limited by secondary rate limits per data flow and transmissions for all data flows having the certain priority are governed by a transmission or flow control per priority. The method has a step of determining a mean value of a duty cycle of the certain priority at the port, where the duty cycle of the certain priority is provided by the transmission or flow control. Furthermore, the method has a step of obtaining the secondary rate limits by adjusting the primary rate limits for the transmission rates of the data flows having the certain priority based on the determined mean value of the duty cycle According to a fourth aspect, the invention relates to a computer program comprising a program code for executing the method of the third aspect for adjusting a set of primary rate limits for transmission rates of data flows having a certain priority in a transmitter when run on at least one computer.

In the following disclosure, example embodiments of the present invention are described with reference to the enclosed figures.

DETAILED DESCRIPTION

Figure 1:
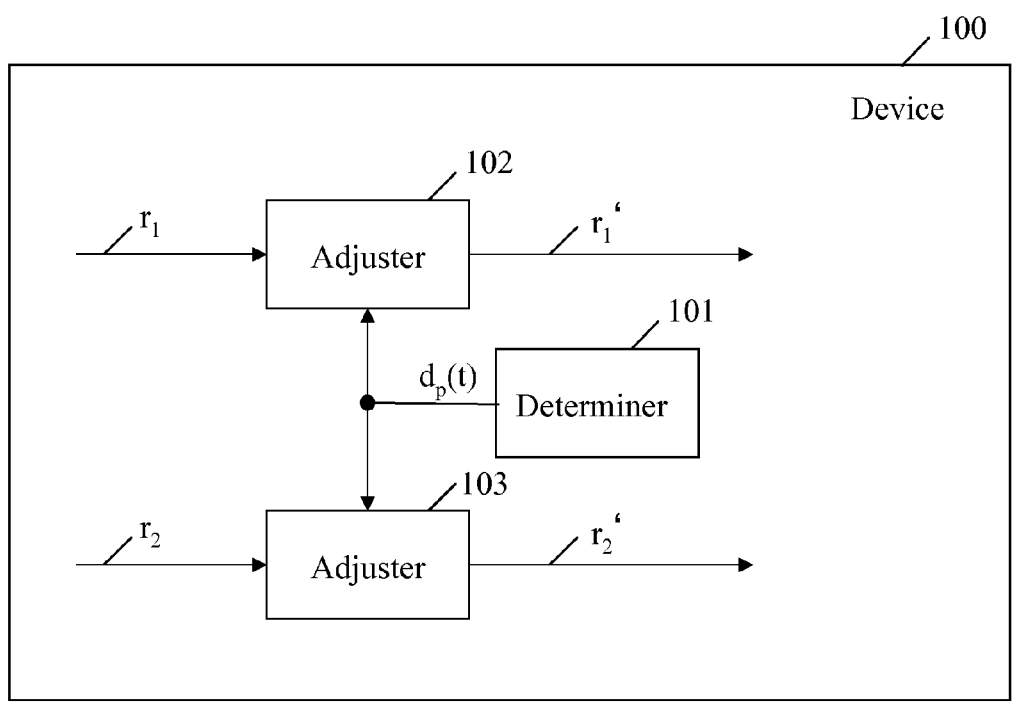
FIG. 1 shows a schematic block diagram of a first embodiment of a device for adjusting a set of primary rate limits for transmission rates of data flows having a certain priority in a transmitter.

In FIG. 1, a schematic block diagram of a first embodiment of a device 100 for adjusting a set of primary rate limits $r_1$, $r_2$ for transmission rates of data flows having a certain priority in a transmitter is depicted. The primary rate limits may be obtained based on congestion feedback per data flow from the network.

Data flows of different priorities including said certain priority are transmitted by a port of the transmitter. Transmissions of the data flows having the certain priority are limited by secondary rate limits $r_1'$, $r_2'$ per data flow and by a transmission of flow control per priority. The device 100 has a determiner 101 and two adjusters 102, 103.

Without loss of generality, FIG. 1 shows only two primary rate limits $r_1$, $r_2$ for the transmission rates of two rate-limited data flows having the certain priority. Thus, the device 100 of FIG. 1 comprises two adjusters, namely a first adjuster 102 for a primary rate limit $r_1$ and a second adjuster 103 for a primary rate limit $r_2$.

Because the transmission of the data flow having the certain priority is limited at the port, there is a duty cycle of the certain priority at the port effected by the transmission or flow control per priority.

The determiner 101 is configured to determine a meet value $d_p(t)$ of the duty cycle of the certain priority at the port.

The first adjuster 102 is configured to adjust the primary rate limit $r_1$ for the transmission rate of a first rate-limited data flow having the certain priority based on the determined mean value $d_p(t)$ of the duty cycle to obtain a secondary rate limit $r_1'$ for the first rate-limited data flow. In particular, the primary rate limit $r_1$ is multiplied with a reciprocal value of the determined mean value $d_p(t)$ of the duty cycle to output the secondary rate $r_1'$.

Further, the second adjuster 103 is configured to adjust a primary rate limit $r_2$ for the transmission rate of a second rate-limited data flow having the certain priority based on the determined mean value $d_p(t)$ of the duty cycle to obtain a secondary rate limit $r_2'$ for the second rate-limited data flow. Particularly, the primary rate limit $r_2$ is also multiplied with the reciprocal value of the determined mean value $d_p(t)$ to output the secondary rate limit $r_2'$.

The secondary rate limits $r_1'$, $r_2'$ for the two rate-limited data flows are obtained such that each of the primary rate limits approaches a value that is suitable for an ideal priority duty cycle of 1. Hence, the primary rate limits become, in a first-order approximation, independent of the current duty cycle of the certain priority at the port.

Figure 2:
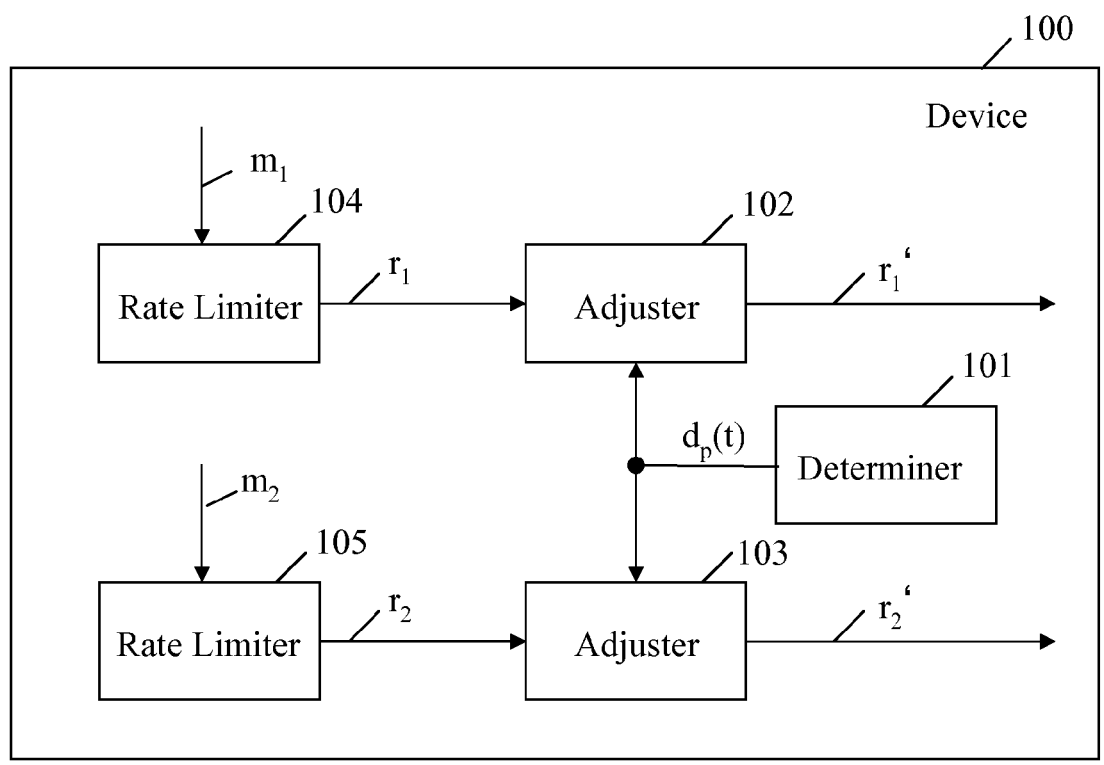
FIG. 2 shows a schematic block diagram of a second embodiment of a device for adjusting a set of primary rate limits for transmission rates of data flows having a certain priority in a transmitter.

FIG. 2 shows a schematic block diagram of a second embodiment of a device 100 for adjusting a set of primary rate limits $r_1$, $r_2$ for transmission rates of data flows having the certain priority in a transmitter.

The second embodiment of the device 100 of FIG. 2 is based on the first embodiment of the device 100 of FIG. 1 and has all above-mentioned features of the first embodiment.

Further, the device 100 of FIG. 2 has a first rate limiter 104 and a second rate limiter 105.

The first rate limiter 104 is coupled to the first adjuster 102. The first rate limiter 104 is configured to provide the first primary rate limit $r_1$ for the transmission rate of the first rate-limited data flow.

In an analogous way, the second rate limiter 105 is coupled to the second adjuster 103 and provides the second primary limit $r_2$.

The respective rate limiter 104, 105 has a receiver (not shown as a distinct unit) that is configured to receive messages $m_1$, $m_2$ identifying the respective rate-limited data flow as a source of congestion for controlling the primary rate limit $r_1$, $r_2$ of the rate limiter 104, 105.

For example, the first rate limiter 104 receives messages $m_1$ identifying the first rate-limited data flow as a source of congestion and controls the primary rate limit $r_1$ in dependence on the received messages $m_1$. Further, the second rate limiter 105 receives messages $m_2$ identifying the second rate-limited data flow as a source of congestion and controls the primary rate limit $r_2$ in dependence on the received messages $m_2$.

Figure 3:
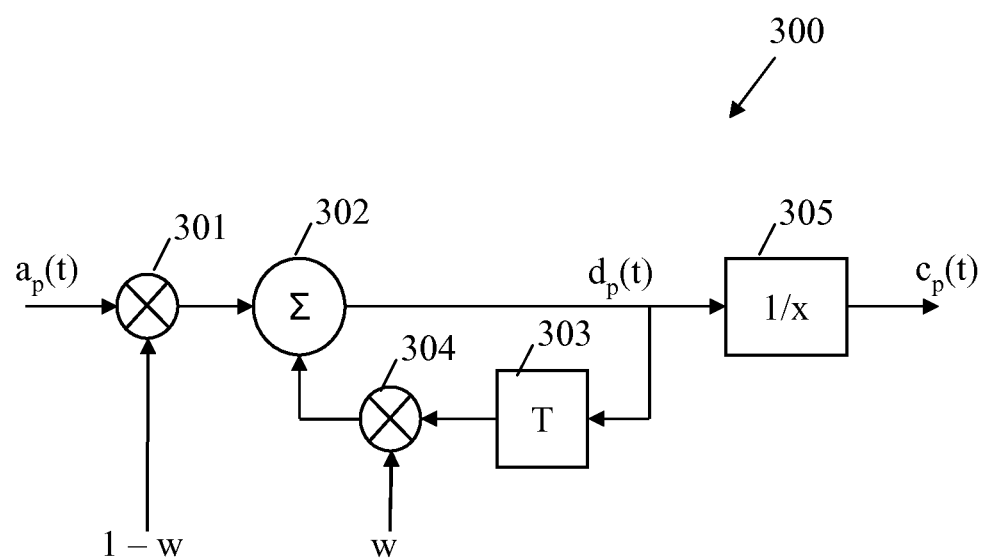
FIG. 3 shows a schematic block diagram of an embodiment of a low-pass filter for providing a compensation factor for duty-cycle correction.

In FIG. 3, a schematic block diagram or an embodiment of a low-pass filter 300 for providing a compensation factor $c_p(t)$ for duty cycle correction is depicted. The low-pass filter 300 may be part of the determiner 101 of FIG. 1 or FIG. 2.

The compensation factor $c_p(t)$ may correspond to the reciprocal value of the determined mean value $d_p(t)$ of the duty cycle value of the certain priority (see FIGS. 1 and 2).

The low-pass filter 300 has a first multiplier 301, an adder 302, a time delay element 303, a second multiplier 304 and a reciprocal element 305 outputting a reciprocal value of a received input. The time delay element 305 has a time constant of 100 μs, for example.

The low-pass filter 300 is configured to provide the mean value $d_p(t)$ of the duty cycle of the certain priority by filtering a binary signal $a_p(t)$. The binary signal $a_p(t)$ indicates that a transmission at the certain priority is currently active or suspended at the port due to the flow control for the certain priority. For example, a "1" of the binary signal $a_p(t)$ may indicate that the certain priority is currently active. Further, a "0" of the binary signal $a_p(t)$ may indicate that the certain priority is currently suspended, in particular paused.

The low-pass filter 300 may be a first-order low-pass filter, with a weighting factor w such that 0<w<1. For example, w=0.99.

Figure 4:
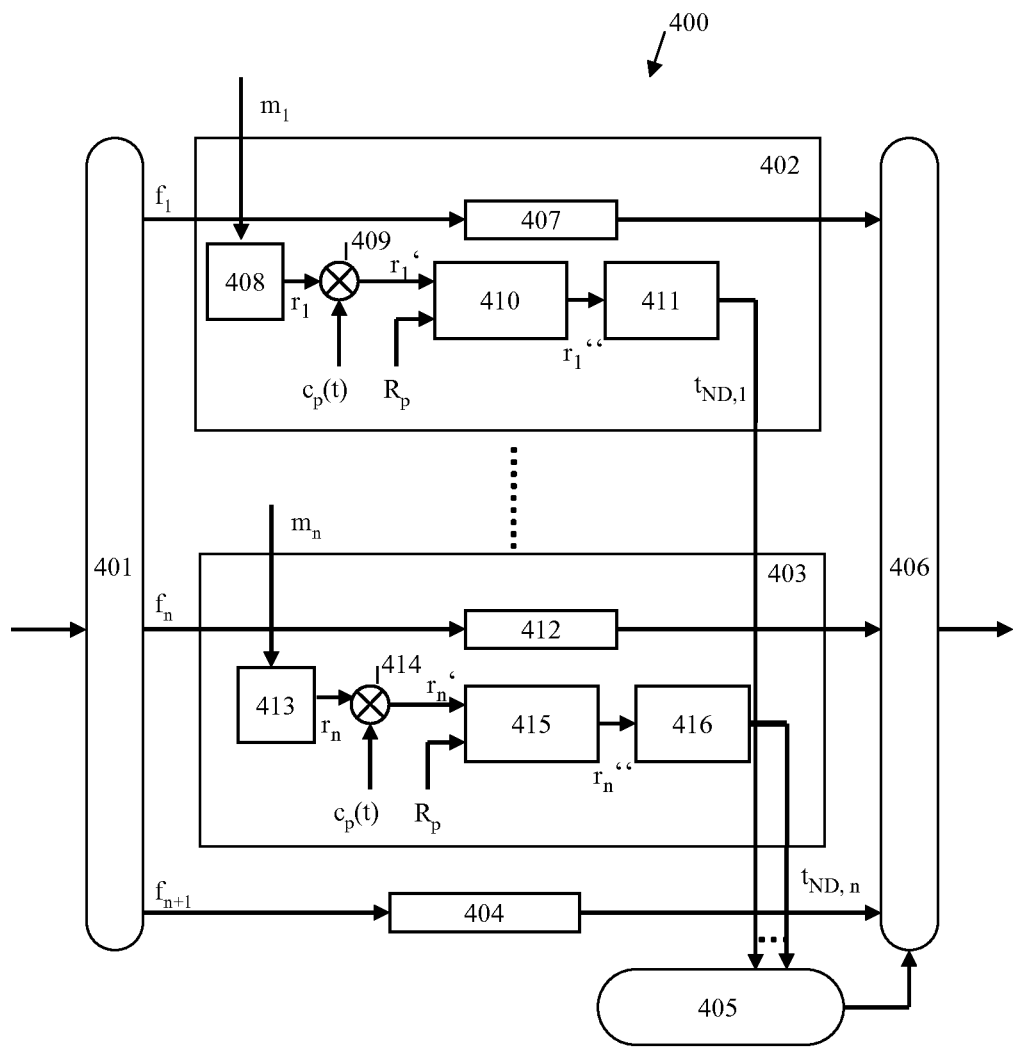
FIG. 4 shows a schematic block diagram of a first embodiment or a transmitter for transmitting data flows having different priorities over one port.

In FIG. 4, a schematic block diagram of a first embodiment of a transmitter 400 for transmitting data flows having different priorities over one port is illustrated. Of course, the transmitter 400 may have a plurality of ports.

Without loss of generality, FIG. 4 shows only one device for scheduling data flows having one certain priority p of said different priorities. If the transmitter 400 is configured to transmit data flows of P different priorities, the transmitter is comprised with P devices as shown in FIG. 4 and explained in the following.

The device for scheduling the certain priority p of the transmitter 400 of FIG. 4 has a flow segregator 401 for the certain priority p, one reaction point (RP) 402, 403 for each rate-limited data flow $f_1$-$f_n$ having the certain priority p, a queue 404 for non-rate-limited data flows $f_{n-1}$, a flow scheduler 405 and a flow multiplexer 406.

For illustration reasons, FIG. 4 shows only two reaction points 402, 403, namely the reaction point 402 for a first rate-limited data flow $f_1$ having the certain priority p and the reaction point 403 for a n-th rate-limited data flow $f_n$ having the certain priority p. Between the reaction point 402 and the reaction point 403, there are (n−2) further reaction points for (n−2) further rate-limited data flows having the certain priority p.

The reaction points 402, 403 and the further reaction points (not shown) may be constructed equally.

The reaction point 402 comprises a rate-limited flow queue 407 for the first rate-limited data flow $f_1$ having the certain priority p. Further, the reaction point 402 has a rate limiter 408 for providing a primary rate limit $r_1$ for the transmission rate of the first rate-limited data flow $f_1$. A multiplier 409 is coupled to the rate limiter 408. The multiplier 409 is configured to multiply the primary rate limit $r_1$ with a compensation factor $c_p(t)$ to obtain the secondary rate limit $r_1'$. The compensation factor $c_p(t)$ corresponds to a reciprocal value of the determined mean value of the duty cycle value. The compensation factor $c_p(t)$ may be obtained as explained above, for example with reference to FIG. 3.

Further, the reaction point 402 has a selector 410. The selector 410 receives the secondary rate limit $r_1'$ as well as a maximum rate $R_p$ that is configured for the certain priority p. The selector 410 selects the minimum of the received signals and outputs the selected minimum $r_1''$ to a scheduler 411 ($r_1''=\min(r_1', R_p)$). The scheduler 411 outputs an earliest next departure time $t_{ND,1}$ for the first data flow $f_1$ based on the received minimum $r_1''$.

The reaction point 403 has a rate-limited flow queue 412 for the n-th rate-limited data flow $f_n$ having the certain priority p. Further, the reaction paint 403 has a rate limiter 413 for providing a primary rate limit $r_n$ for the transmission rate of the n-th rate-limited data flow $f_n$. A multiplier 414 is coupled to the rate limiter 413. The multiplier 414 is configured to multiply the primary rate limit $r_n$ with the compensation factor $c_p(t)$ to obtain the secondary rate limit $r_n'$. A selector 415 receives the secondary rate limit $r_n'$ as well as the maximum rate $R_p$ that is configured for the certain priority p. The selector 415 selects the minimum of the received signals and outputs the selected minimum $r_n''$ to a scheduler 416 ($r_n''=\min(r_n', R_p)$). A scheduler 416 outputs an earliest next departure time $t_{ND,n}$ for the n-th data flow $f_n$ based on the received minimum $r_n''$.

The flow scheduler 405 is configured to schedule the transmission of data frames across the rate-limited data flows $f_1$-$f_n$ having the certain priority p on the basis of the received earliest next departure times $t_{ND,1}$-$t_{ND,n}$.

Based on the received earliest next departure times $t_{ND,1}$-$t_{ND,n}$, the flow scheduler 405 controls the flow multiplexer 406 which is coupled to the rate-limited flow queues 407 and 412 for the rate-limited data flows $f_1$ and $f_n$, respectively, and to the queue 404 for the non-rate-limited data flows $f_{n+1}$. The flow multiplexer 406 outputs a scheduled data flow for the priority p.

In particular, the device of FIG. 4 may be embodied by a QCN scheduler stage for scheduling the data flows of a certain priority according to QCN rate limits.

Figure 5:
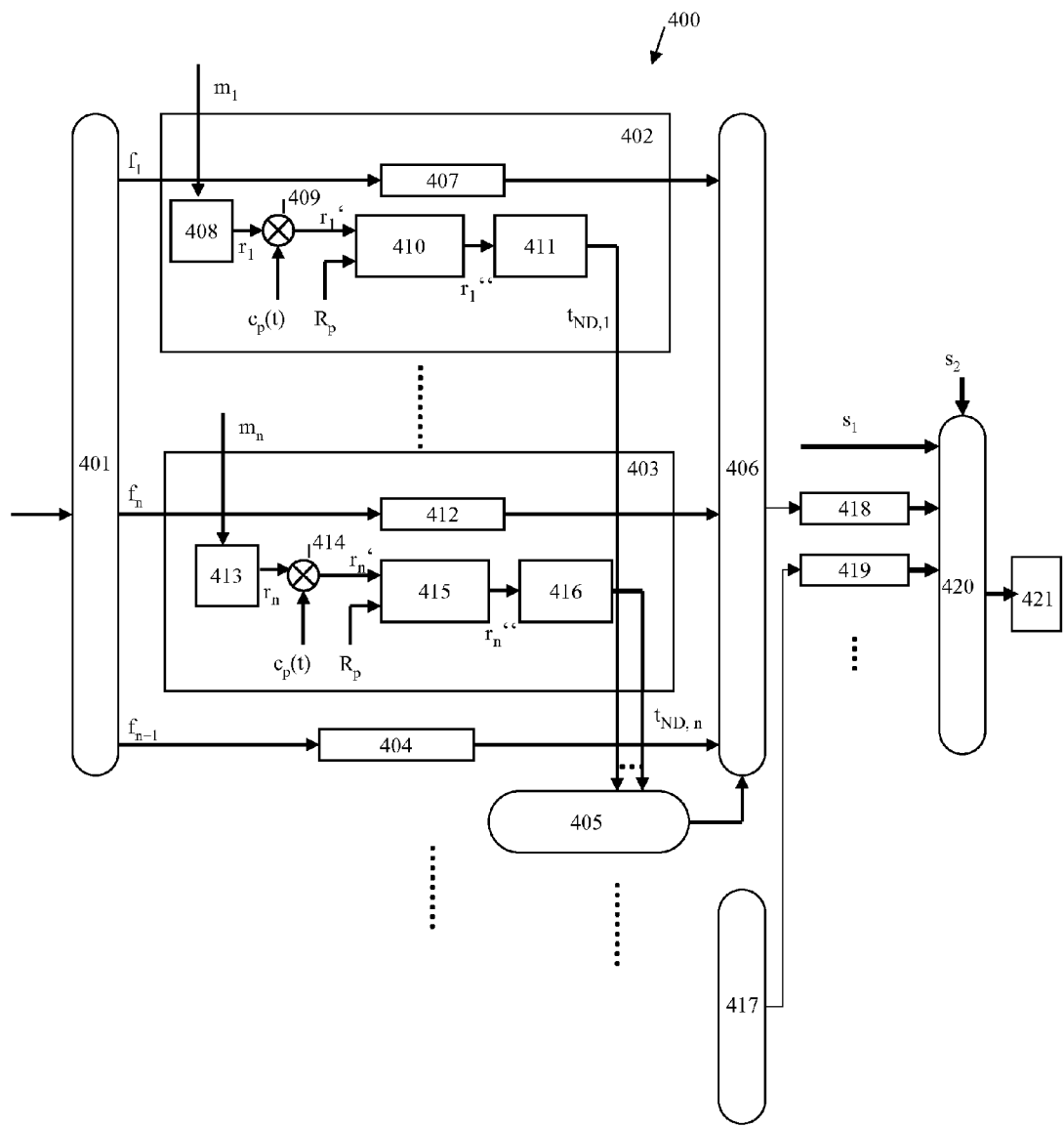
FIG. 5 shows a schematic block diagram of a second embodiment of a transmitter for transmitting data flows having different priorities over one port.

In FIG. 5, a schematic block diagram of a second embodiment of a transmitter 400 for transmitting data flows having different priorities over one port is illustrated.

The second embodiment of the transmitter 400 of FIG. 5 is based on the first embodiment of the transmitter 400 of FIG. 4 and has all above-mentioned features of the first embodiment.

The transmitter 400 further has a respective flow multiplexer 417 for the respective further certain priority of the different priorities. For illustration reasons, only one further flow multiplexer 417 is shown in FIG. 5.

In an analogous way, FIG. 5 shows only two transmission queues 418, 419 coupled to the flow multiplexers 406, 407. In general, the number of transmission queues equals the number of priorities or, equivalently, the number of flow multiplexers in the transmitter 400. In detail, the flow multiplexer 406 is coupled towards the transmission queue 418 for one certain priority of the different priorities, and the flow multiplexer 417 is coupled towards a further transmission queue 419 for a further certain priority of the different priorities.

All transmission queues 418, 419 are coupled to a transmission selector 420 for the coupled port 421. The transmission selector 411 is configured to select frames for transmission from the different transmission queues 418, 419 corresponding to the different priorities. The transmission selector 420 may take into account a pause state of each priority and any scheduling constraints, such as strict-priority scheduling and bandwidth allocation, imposed on priorities or traffic classes by IEEE 801.1Qaz Enhanced Transmission Selections (ETS).

In this regard, the transmission selector 420 is configured to receive messages $s_1$ indicating or including transmitted PFC pauses and messages $s_2$ indicating or including received PFC pauses. The transmission selector 420 outputs scheduled data flows over all different priorities to the coupled port 421 of the transmitter.

Figure 6:
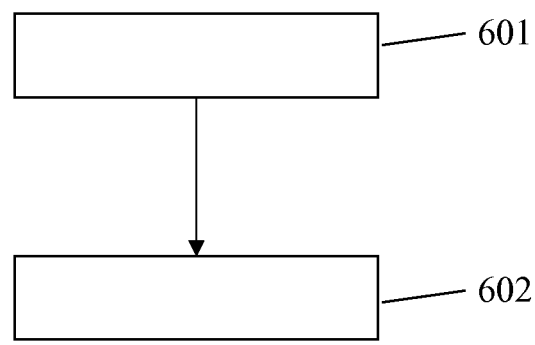
FIG. 6 shows an embodiment of a sequence of method steps for adjusting a set of primary rate limits for transmission rates of data flows having a certain priority in a transmitter.

FIG. 6 shows an embodiment of a sequence of method steps for adjusting a set of primary rate limits for transmission rates of data flows having a certain priority in a transmitter.

It may be noted that by one port of the transmitter, data flows of different priorities including said certain priority are transmitted. The transmission of the data flows having the certain priority is limited by the secondary rate limits per data flow and by a transmission or flow control per priority.

In step 601, a mean value of a duty cycle of the certain priority at the port is determined. The duty cycle of the certain priority at the port may be provided by the transmission or flow control.

In step 602, the secondary rate limits are obtained by adjusting the primary rate limits for the transmission rates of the data flows having the certain priority based on the determined mean value or the duty cycle.

Computerized devices can be suitably designed for implementing embodiments of the present invention as described herein. In that respect, it can be appreciated that the methods described herein are largely non-interactive and automated. In example embodiments, the methods described herein can be implemented either in an interactive, partly-interactive or non-interactive system. The methods described herein can be implemented in software (e.g., firmware), hardware, or a combination thereof. In example embodiments, the methods described herein are implemented in software, as an executable program, the latter executed by suitable digital processing devices. In further example embodiments, at least one step of above method of FIG. 6 is implemented in software, as an executable program, the latter executed by suitable digital processing devices. In further example embodiments, the determining step and the obtaining step of above method of FIG. 6 are implemented in software, in particular for the case that the duty cycle of the certain priority at the port is provided by that software. More generally, embodiments of the present invention can be implemented wherein general-purpose digital computers, such as personal computers, workstations, etc., are used.

Figure 7:
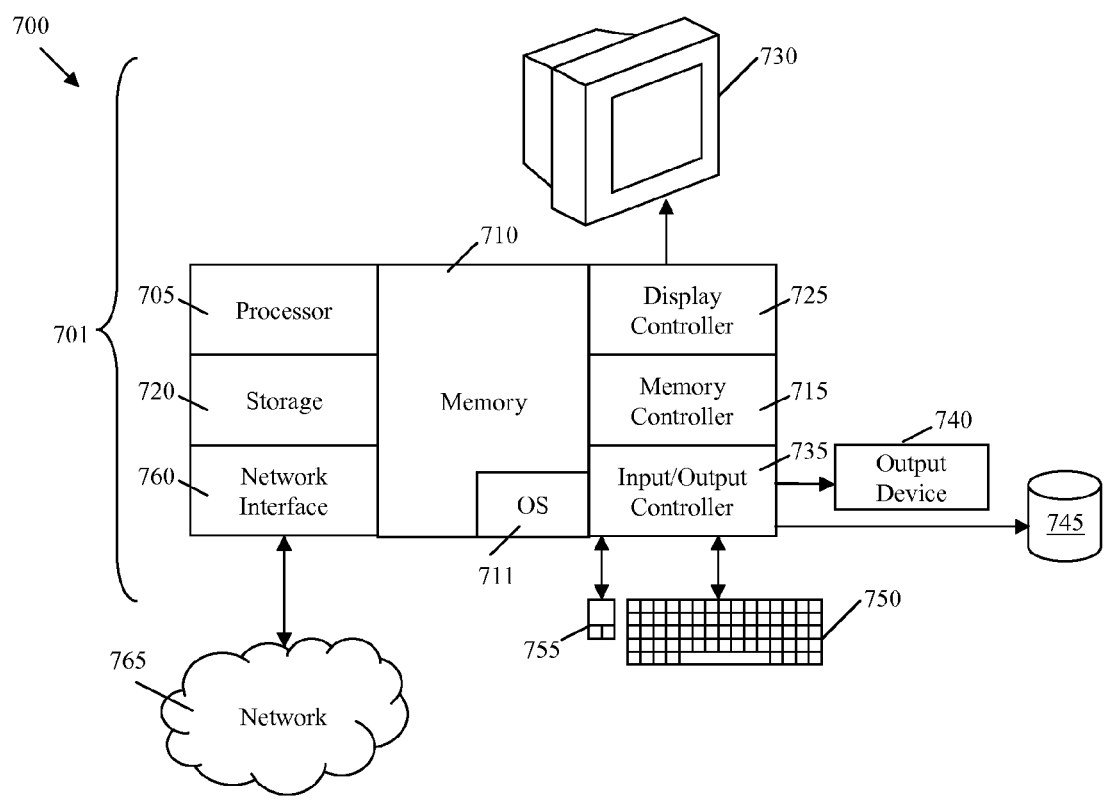
FIG. 7 shows a schematic block diagram of an embodiment of a system adapted for performing the method for adjusting a set of primary rate limits for transmission rates of data flows having a certain priority in a transmitter Similar or functionally similar elements in the figures have been allocated the same reference signs if not otherwise indicated.

For instance, the system 700 depicted in FIG. 7 schematically represents a computerized unit 701, e.g., a general-purpose computer. In example embodiments, in terms of hardware architecture, as shown in FIG. 7, the unit 701 includes a processor 705, memory 710 coupled to a memory controller 715, and one or more input and/or output (110) devices 740, 745, 750, 755 (or peripherals) that are communicatively coupled via a local input/output controller 735. The input/output controller 735 can be, but is not limited to, one or more buses or other wired or wireless connections, as is known in the art. The input/output controller 735 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 705 is a hardware device for executing software, particularly that stored in memory 710. The processor 705 can be any custom made or commercially available processor, a central processing unit (CPU), an auxiliary processor among several processors associated with the computer 701, a semiconductor based microprocessor (in the form of a microchip or chip set), or generally any device for executing software instructions.

The memory 710 can include any one or combination of volatile memory elements (e.g., random access memory) and nonvolatile memory elements. Moreover, the memory 710 may incorporate electronic, magnetic, optical, and/or other types of storage media. Note that the memory 710 can have a distributed architecture, where various components are situated remote from one another, but can be accessed by the processor 705.

The software in memory 710 may include one or more separate programs, each of which comprises an ordered listing of executable instructions for implementing logical functions. In the example of FIG. 7, the software in the memory 710 includes methods described herein in accordance with example embodiments and a suitable operating system (OS) 711. The OS 711 essentially controls the execution of other computer programs, such as the methods as described herein (e.g., FIG. 6), and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 710, so as to operate properly in connection with the OS 711. Furthermore, the methods can be written as an object oriented programming language, which has classes of data and methods, or a procedure programming language, which has routines, subroutines and/or functions.

Possibly, a conventional keyboard 750 and mouse 755 can be coupled to the input/output controller 735. Other I/O devices 740-755 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 735 for further processing. Sensor nodes are ideally small, consume low energy, are autonomous and operate unattended.

In addition, the I/O devices 740-755 may further include devices that communicate both inputs and outputs. The system 700 can further include a display controller 725 coupled to a display 730. In example embodiments, the system 700 can further include a network interface or transceiver 760 for coupling to a network 765.

The network 765 transmits and receives data between the unit 701 and external systems. The network 765 is possibly implemented in a wireless fashion, e.g., using wireless protocols and technologies, such as WiFi, WiMax, etc. The network 765 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 765 can also be an IP-based network for communication between the unit 701 and any external server, client and the like via a broadband connection. In example embodiments, network 765 can be a managed IP network administered by a service provider. Besides, the network 765 can be a packet-switched network such as a LAN, WAN, Internet network, etc.

If the unit 701 is a PC, workstation, intelligent device or the like, the software in the memory 710 may further include a basic input output system (BIOS). The BIOS is stored in ROM so that the BIOS can be executed when the computer 701 is activated.

When the unit 701 is in operation, the processor 705 is configured to execute software stored within the memory 710, to communicate data to and from the memory 710, and to generally control operations of the computer 701 pursuant to the software. The methods described herein and the OS 711, in whole or in part are read by the processor 705, typically buffered within the processor 705, and then executed. When the methods described herein (e.g. with reference to FIG. 6) are implemented in software, the methods can be stored on any computer readable medium, such as storage 720, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 701, partly thereon, partly on a unit 701 and another unit 701, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams can be implemented by one or more computer program instructions. These computer program instructions may be provided to a processor of general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

The invention claimed is:

1. A device for adjusting a set of primary rate limits for transmission rates of data flows in a transmitter, comprising:
   a determiner, the determiner determining, for a certain priority (p) and at a port in the transmitter, a mean value ($d_p(t)$) of a duty cycle,
   wherein the mean value of the duty cycle corresponds to a fraction of time during which transmission at the certain priority is not suspended according to a transmission or flow control,
   wherein data flows having different priorities including a data flow having the certain priority, are transmitted by the port of the transmitter, transmissions for rate-limited data flows having the certain priority in a set of rate-limited data flows are limited by a set of secondary rate limits ($r_1', r_2', \ldots r_n'$) per data flow, and transmissions for all data flows having the certain priority are controlled by the transmission or flow control per priority;
   a number of adjusters, the adjusters computing the set of secondary rate limits ($r_1', r_2', \ldots r_n'$) by adjusting a corresponding set of primary rate limits ($r_1, r_2, \ldots r_n$) for the transmission rates of the data flows having the certain priority based on the determined mean value $d_p(t)$ of the duty cycle; and for each rate-limited data flow having the certain priority, the device comprising:

a rate limiter for providing a primary rate limit in the set of primary rate limits $(r_1, r_2, \ldots r_n)$ for the transmission rate; and an adjuster, in the number of adjusters, for computing a secondary rate limit in the set of secondary rate limits $(r_1', r_2', \ldots r_n')$ by adjusting the provided primary rate limit in the set of primary rate limits $(r_1, r_2, \ldots r_n)$ based on the determined mean value $(d_p(t))$ of the duty cycle, wherein the adjuster is configured to multiply the primary rate limit in the set of primary rate limits $(r_1, r_2, \ldots r_n)$ with a reciprocal value $(c_p(t))$ of the determined mean value $(d_p(t))$ of the duty cycle value to obtain the secondary rate limit in the set of secondary rate limits $(r_1', r_2', \ldots r_n')$.

2. The device of claim 1, wherein the rate limiter includes a receiver that is configured to receive a set of messages $(m_1, m_2, \ldots m_n)$ identifying the rate-limited data flow as a source of congestion for controlling the primary rate limit in the set of primary rate limits $(r_1, r_2, \ldots r_n)$ of the rate limiter.

3. The device of claim 1, comprising for each priority:

a flow scheduler for scheduling the transmission of data frames across a set of rate-limited data flows $(f_1, \ldots, f_n)$ having the certain priority on the basis of the secondary rate limit in the set of secondary rate limits $(r_1', r_2', \ldots r_n')$ and a corresponding set of earliest next departure times $(t_{ND,1}, \ldots, t_{ND,n})$ for each rate-limited data flow in the set of rate-limited data flows $(f_1, \ldots, f_n)$.

4. The device of claim 3, comprising:

a rate-limited flow queue for each data flow in the set of rate-limited data flows $(f_1, \ldots, f_n)$ having the certain priority; and a flow multiplexer for the certain priority coupled to the rate-limited flow queues and the flow scheduler for the certain priority for controlling the flow multiplexer on the basis of the earliest next departure times in a set of earliest next departure times $(t_{ND,1}, \ldots, t_{ND,n})$ computed by individual schedulers of the rate-limited data flows in the set of rate-limited data flows $(f_1, \ldots, f_n)$.

5. The device of claim 1, comprising for each rate-limited data flow in the set of rate-limited data flows $(f_1, \ldots, f_n)$ having the certain priority:

a selector for selecting a minimum in a set of minima $(r_1'', \ldots, r_n'')$ of the secondary rate limit in the set of secondary rate limits $(r_1, \ldots, r_n)$ and of a maximum rate $(R_p)$ that is configured for the certain priority.

6. The device of claim 5, comprising for each priority:

a flow scheduler for scheduling the transmission of data frames across the set of rate-limited data flows $(f_1, \ldots, f_n)$ having the certain priority on the basis of the selected minimum in a set of minima $(r_1'', \ldots, r_n'')$ of the secondary rate limit in the set of secondary rate limits $(r_1', \ldots, r_n')$ and of the maximum rate $(R_p)$ and a corresponding earliest next departure time in a set of earliest next departure times $(t_{ND,1}, \ldots, t_{ND,n})$ for each rate-limited data flow in the set of rate-limited data flows $(f_1, \ldots, f_n)$.

7. The device of claim 1, wherein the determiner has a low-pass filter for providing the mean value $(d_p(t))$ of the duty cycle of the certain priority by filtering a binary signal $(a_p(t))$ indicating that the transmission at the certain priority is currently active or suspended at the port due to the flow control for the certain priority.

8. The device of claim 1, wherein the certain priority is flow-controlled by per-priority pause and unpause signalling.

9. The device of claim 1, wherein the certain priority is selected for transmission based on per-priority pause and unpause signalling and multi-priority scheduling constraints.

10. A transmitter for transmitting data flows having different priorities over one port, the transmitter comprising:

a device for each certain priority of the different priorities, the device comprising:

a determiner to determine, for a certain priority (p) and at a port in the transmitter, a mean value $(d_p(t))$ of a duty cycle, wherein the mean value of the duty cycle corresponds to a fraction of time during which transmission at the certain priority is not suspended according to a transmission or flow control, wherein data flows having different priorities including a data flow having the certain priority, are transmitted by the port of the transmitter, transmissions for rate-limited data flows having the certain priority are limited by a set of secondary rate limits $(r_1', r_2', \ldots r_n')$ per data flow, and transmissions for all data flows having the certain priority are controlled by the transmission or flow control per priority;

a number of adjusters to compute the set of secondary rate limits $(r_1', r_2', \ldots r_n')$ by adjusting a corresponding set of primary rate limits $(r_1, r_2, \ldots r_n)$ for the transmission rates of the data flows having the certain priority based on the determined mean value $d_p(t)$ of the duty cycle; and for each rate-limited data flow having the certain priority, the device comprising:

a rate limiter for providing a primary rate limit in the set of primary rate limits $(r_1, r_2, \ldots r_n)$ for the transmission rate; and an adjuster, in the number of adjusters, for computing a secondary rate limit in the set of secondary rate limits $(r_1', r_2', \ldots r_n')$ by adjusting the provided primary rate limit in the set of primary rate limits $(r_1, r_2, \ldots r_n)$ based on the determined mean value $(d_p(t))$ of the duty cycle, wherein the adjuster is configured to multiply the primary rate limit in the set of primary rate limits $(r_1, r_2, \ldots r_n)$ with a reciprocal value $(c_p(t))$ of the determined mean value $(d_p(t))$ of the duty cycle value to obtain the secondary rate limit in the set of secondary rate limits $(r_1', r_2', \ldots r_n')$.

11. The transmitter of claim 10, wherein the transmitter is embodied in one of (i) a Converged Enhanced Ethernet (CEE) compliant Network Interface card (NIC) and (ii) a gateway.

12. A computer program product for adjusting a set of primary rate limits for transmission rates of data flows in a transmitter, the computer program product comprising program code which upon execution by a processor causes:

a data processing system to determine, for a certain priority and at a port in the transmitter, a mean value of a duty cycle, wherein the mean value of the duty cycle corresponds to a fraction of time during which transmission at the certain priority is not suspended according to a transmission or flow control, wherein data flows having different priorities, including a data flow having the certain priority, are transmitted by the port of the transmitter, transmissions for rate-limited data flows having the certain priority are limited by a set of secondary rate limits $(r_1', r_2', \ldots r_n')$ per data flow, and transmissions for all data flows having the certain priority are controlled by the transmission or flow control per priority;

the data processing system to compute the set of secondary rate limits ($r_1'$, $r_2'$, ... $r_n'$) by adjusting a corresponding set of primary rate limits for the transmission rates of the data flows having the certain priority based on the determined mean value of the duty cycle; and for each rate-limited data flow having the certain priority further causing:

the data processing system to provide a primary rate limit in the set of primary rate limits $r_1$, $r_2$, ... $r_n$) for the transmission rate; and the data processing system to compute a secondary rate limit in the set of secondary rate limits ($r_1'$, $r_2'$, ... $r_n'$) by adjusting the provided primary rate limit in the set of primary rate limits $r_1$, $r_2$, ... $r_n$) based on the determined mean value ($d_p(t)$) of the duty cycle, wherein the computing includes multiply the primary rate limit in the set of primary rate limits ($r_1$, $r_2$, ... $r_n$) with a reciprocal value ($c_p(t)$) of the determined mean value ($d_p(t)$) of the duty cycle value to obtain the secondary rate limit in the set of secondary rate limits ($r_1'$, $r_2'$, ... $r_n'$).

* * * * *